United States Patent
Lee et al.

(10) Patent No.: US 9,625,979 B2
(45) Date of Patent: Apr. 18, 2017

(54) METHOD FOR REDUCING POWER CONSUMPTION AND ELECTRONIC DEVICE THEREOF

(71) Applicant: Samsung Electronics Co., Ltd., Gyeonggi-do (KR)

(72) Inventors: Sang-Yup Lee, Daegu (KR); Man-Cheol Heo, Gyeongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/546,869

(22) Filed: Nov. 18, 2014

(65) Prior Publication Data

US 2015/0138120 A1    May 21, 2015

(30) Foreign Application Priority Data

Nov. 18, 2013  (KR) .......................... 10-2013-0139951

(51) Int. Cl.
| | |
|---|---|
| *G06F 1/32* | (2006.01) |
| *G06F 3/041* | (2006.01) |
| *G06F 3/0354* | (2013.01) |
| *G06F 3/038* | (2013.01) |
| *G06F 3/0488* | (2013.01) |

(52) U.S. Cl.
CPC .......... *G06F 1/3287* (2013.01); *G06F 1/3262* (2013.01); *G06F 3/038* (2013.01); *G06F 3/03545* (2013.01); *G06F 3/0416* (2013.01); *G06F 3/0488* (2013.01); *G06F 2200/1632* (2013.01); *G06F 2203/04106* (2013.01); *G06F 2203/04807* (2013.01); *Y02B 60/32* (2013.01)

(58) Field of Classification Search
CPC .. G06F 1/3287; G06F 1/3262; G06F 3/03545; G06F 3/038; G06F 3/0416; G06F 3/0488; G06F 2200/1632; G06F 2203/04106; G06F 2203/04807
USPC ........................................... 345/173
See application file for complete search history.

(56) References Cited

U.S. PATENT DOCUMENTS

| | | | |
|---|---|---|---|
| 5,051,736 A | 9/1991 | Bennett et al. | |
| 5,594,215 A | 1/1997 | Jeng | |
| 2003/0105983 A1* | 6/2003 | Brakmo ................ | G06F 1/3203 713/320 |
| 2009/0115745 A1* | 5/2009 | Chuang ................. | G06F 1/1626 345/179 |
| 2010/0144395 A1* | 6/2010 | Komiya ................. | G06F 3/016 455/566 |
| 2013/0069896 A1* | 3/2013 | Chen ...................... | G06F 3/0488 345/173 |
| 2013/0167074 A1* | 6/2013 | Oonishi ................ | G06F 3/0488 715/799 |

\* cited by examiner

*Primary Examiner* — Stephen Sherman

(57) ABSTRACT

A method in an electronic device, includes receiving an instruction to enter a power saving mode, switching a first sensing area of the electronic device into an idle mode and a second sensing area of the electronic into a lock mode, detecting an input on the first sensing area in the idle mode, and unlocking the second sensing area. An electronic device includes a processor configured to determine whether to receive an instruction to enter a power saving mode, switch a first sensing area of the electronic device into an idle mode and a second sensing area of the electronic device into a lock mode, detect an input on the first sensing area in the idle mode, and unlock the second sensing area.

10 Claims, 10 Drawing Sheets

METHOD FOR REDUCING POWER CONSUMPTION AND ELECTRONIC DEVICE THEREOF

PRIORITY

The present application is related to and claims priority under 35 U.S.C. §119 to an application filed in the Korean Intellectual Property Office on Nov. 18, 2013 and assigned Serial No. 10-2013-0139951, the contents of which are incorporated herein by reference.

TECHNICAL FIELD

Various embodiments of the present disclosure relate to a method for reducing power consumption and an electronic device thereof.

BACKGROUND

Due to the development of information communication technology and semiconductor technology, various electronic devices are developing into multimedia devices providing various multimedia services. For example, the electronic devices provide various multimedia services such as voice call services, video call services, messenger services, broadcasting services, wireless internet services, camera services, and music playback services.

SUMMARY

To address the above-discussed deficiencies, it is a primary object to provide a device and method for improving user's convenience as a set memo is inputted after the insertion of a set input tool by using another input tool.

A method in an electronic device, includes receiving an instruction to enter a power saving mode, in response to receiving the instruction, switching a first sensing area of the electronic device into an idle mode and a second sensing area of the electronic device into a lock mode, detecting an input on the first sensing area in the idle mode, and in response to detecting the input on the first sensing area, unlocking the second sensing area.

In some embodiments, the instruction to enter the power saving mode comprises that a first input tool is inserted into a tool-holder in the electronic device.

In some embodiments, the first input tool is a stylus pen.

In some embodiments, the first sensing area is located on a part of a bezel of a touch screen disposed on the electronic device.

In some embodiments, the first sensing area comprises a pair of a left bezel portion and a right bezel portion.

In some embodiments, the first sensing area comprises a pair of a north bezel portion and a south bezel portion.

In some embodiments, the second sensing area is a display area of the touch screen.

In some embodiments, the second sensing area in the lock mode does not detect any input on itself.

In some embodiments, the second sensing area in the lock mode does not detect any input on the second sensing area.

In some embodiments, the method further includes, if the input on the first sensing area in the idle mode has not been detected for a certain time, switching the electronic device into a sleep mode.

An electronic device includes a processor configured to determine whether to receive an instruction to enter a power saving mode, in response to receiving the instruction, switch a first sensing area of the electronic device into an idle mode and a second sensing area of the electronic device into a lock mode, detect an input on the first sensing area in the idle mode, and in response to detecting the input on the first sensing area, unlock the second area.

According to another aspect of the present disclosure, an electronic device includes: a processor switching only a first area among a set first area and a second area into an idle mode and when an input is detected from the first area, switching the second area set to a lock mode into the idle mode; and a memory storing data controlled by the processor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
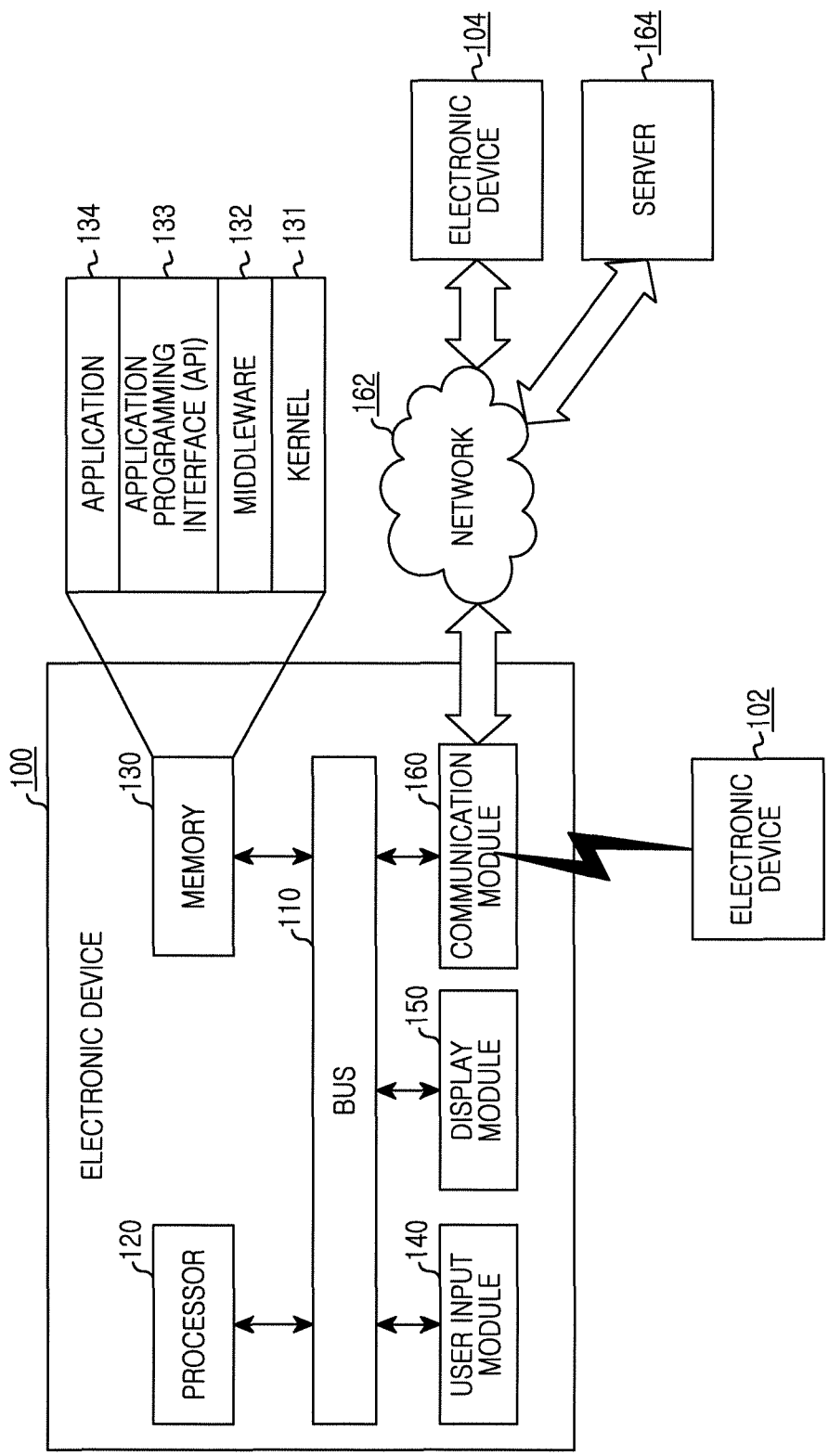
FIG. 1 is a block diagram illustrating an electronic device according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, embodiments of the present disclosure will be described in more detail with reference to the accompanying drawings. In relation to the present disclosure, specific embodiments are illustrated in drawings and related detailed descriptions are listed and also various modifications are possible and thus various embodiments are provided. Accordingly, the present disclosure is not intended to limit specific embodiments and is understood that it should include all modifications, equivalents, and substitutes within the scope and technical range of the present disclosure. With respect to the descriptions of the drawings, like reference numerals refer to like elements.

An electronic device according to an embodiment of the present disclosure can be a device having a communication function. For example, the electronic device can be at least one or a combination of a smart phone, a tablet personal computer (PC), a mobile phone, a video phone, an e-book reader, a desktop PC, a laptop PC, a netbook computer, personal digital assistant (PDA), a portable multimedia player (PMP), an MP3 player, a mobile medical device, an electronic bracelet, an electronic necklace, an electronic necklace, an electronic appcessory, a camera, a wearable device, an electronic clock, a wrist watch, smart white appliance (for example, a refrigerator, an air conditioner, a vacuum cleaner, an artificial intelligence robot, a TV, a digital video disk (DVD) player, an audio system, an oven, a microwave, a washing machine, an air purifier, and a digital photo frame), various medical devices (for example, magnetic resonance angiography (MRA), magnetic resonance imaging (MRI), computed tomography (CT), tomography, and ultrasonograph), a navigation device, a global positioning system (GPS) receiver, an event data recorder (EDR), a flight data recorder (FDR), a set-top box, a TV box (for example, Samsung HomeSync™, Apple TV™, or a Google TV™), an electronic dictionary, a vehicle infotainment device, electronic equipment for ship (for example, a navigation device for ship and a gyro compass), avionics, a security device, an electronic garment, an electronic key, a camcorder, a game console, head-mounted display (HMD), a flat panel display device, an electronic album, part of a furniture or building/structure including a communication function, an electronic board, an electronic signature receiving device, and a projector. It is apparent to those skilled in the art that the electronic device is not limited to the above-mentioned devices.

FIG. 1 is a block diagram illustrating an electronic device according to an embodiment of the present disclosure. Referring to FIG. 1, the electronic device 100 can include a bus 110, a processor 120, a memory 130, a user input module 140, a display module 150, and a communication module 160.

The bus 110 can be a circuit connecting the above-mentioned components to each other and delivering a communication (for example, a control message) therebetween.

The processor 120 receives an instruction from the above other components (for example, the memory 130, the user input module 140, the display module 150, and the communication module 160) through the bus 110, interprets the received instruction, and performs operations and data processing in response to the interpreted instruction.

The memory 130 can store an instruction or data received from the processor 120 or other components (for example, the user input module 140, the display module 150, and the communication module 160) or an instruction or data generated from the processor 120 or other components. The memory 130 can include programming modules, for example, a kernel 131, a middleware 132, an application programming interface (API) 133, and an application 134. Each of the above-mentioned programming modules can be configured with software, firmware, hardware, or a combination thereof.

The kernel 131 can control or manage system resources (for example, the bus 110, the processor 120, or the memory 130) used for performing operation or functions implemented by the remaining other programming modules, for example, the middleware 132, the API 133, or the application 134. Additionally, the kernel 131 can provide an interface for accessing an individual component of the electronic device 100 from the middleware 132, the API 133, or the application 134 and controlling or managing it.

The middleware 132 can serve as an intermediary role for exchanging data between the API 133 or the application 134 and the kernel 131 through communication. Additionally, in relation to job requests received from a plurality of applications 134, the middleware 132 can perform a load balancing on the job requests by using a method of assigning a priority for using a system resource (for example, the bus 110, the processor 120, or the memory 130) to at least one application among the plurality of applications 134.

The API 133, as an interface through which the application 134 controls a function provided from the kernel 131 or the middleware 132, can include at least one interface or function for file control, window control, image processing, or character control.

The user input module 140 can receive an instruction or data from a user and deliver it to the processor 120 or the memory 130 through the bus 110. The display module 150 can display an image, video, or data to a user.

The communication module 160 can connect a communication between another electronic device 102 and the electronic device 100. The communication module 160 can support a predetermined short range communication protocol (for example, wireless fidelity (Wi-Fi), Bluetooth (BT), near field communication (NFC)) or a predetermined network communication 162 (for example, Internet, local area network (LAN), wide area network (WAN), telecommunication network, cellular network, satellite network or plain old telephone service (POTS)). Each of the electronic devices 102 and 104 can be identical to (for example, the same type) or different from (for example, a different type) the electronic device 100.

Figure 2:
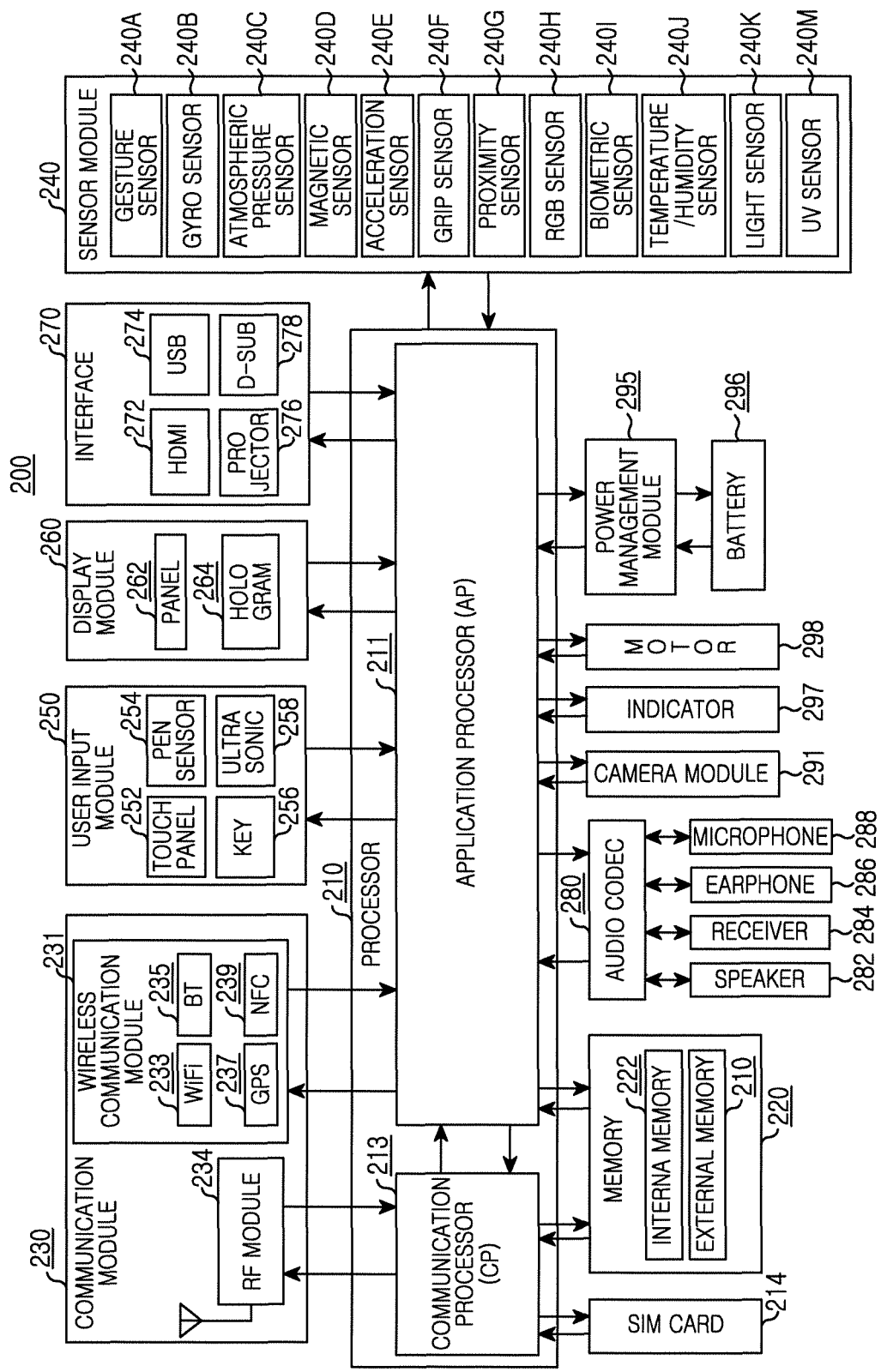
FIG. 2 is a block diagram of hardware according to an embodiment of the present disclosure.

FIG. 2 is a block diagram of hardware according to an embodiment of the present disclosure. The hardware 200 can be the electronic device 100 shown in FIG. 1, for example. Referring to FIG. 2, the hardware 200 includes at least one processor 210, a subscriber identification module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 (for example, the processor 120) can include at least one application processor (AP) 211 or at least one communication processor (CP) 213. The processor 210 can be the processor 120 shown in FIG. 1, for example. Although the AP 211 and the CP 213 included in the processor 210 are shown in FIG. 2, they can be included in different IC packages. According to an embodiment of the present disclosure, the AP 211 and the CP 213 can be included in one IC package. The processor 210 can switch only a first area among predetermined first and second areas into an idle mode and when an input is detected from the first area, can switch the second area set to a lock mode switches into the idle mode. Additionally, the processor 210 detects that a first input tool is inserted into a body of the device. Additionally, the processor 210 can determine whether a battery saving mode is set to operate and can then confirm that the battery saving mode is set to operate. Additionally, when the processor 210 does not receive a command for receiving an input from a second input tool, it can switch an operating mode into a sleep mode.

The AP 211 cancontrols a plurality of hardware or software components by executing an operating system or an application program. The AP can perform various data processes and operations on multimedia data. The AP 211 can be implemented with a system on chip (SoC), for example. According to an embodiment of the present disclosure, the processor 210 can further include a graphic processing unit (GPU) (not shown). The CP 213 can manage a data link in a communication between an electronic device (for example, the electronic device 100) including the hardware 200 and other electronic devices connected via a network and can convert a communication protocol. The CP 213 can be implemented with a SoC, for example. According to an embodiment of the present disclosure, the CP 213 can perform at least part of a multimedia control function. The CP 213 can perform a distinction and authentication of a terminal in a communication network by using a subscriber identification module (for example, the SIM card 214), for example. Additionally, the CP 213 can provide services, for example, a voice call, a video call, a text message, or packet data, to a user.

Additionally, the CP 213 can control the data transmission of the communication module 230. As shown in FIG. 2, components such as the CP 213, the power management module 295, or the memory 220 are separated from the AP 211, but according to an embodiment of the present disclosure, the AP 211 can be implemented including some of the above-mentioned components (for example, the CP 213).

According to an embodiment of the present disclosure, the AP 211 or the CP 213 can load commands or data, which are received from a nonvolatile memory or at least one of other components connected thereto, into a volatile memory and can process them. Furthermore, the AP 211 or the CP 213 can store data received from or generated by at least one of other components in a nonvolatile memory.

The SIM card 214 can be a card implementing a subscriber identification module and can be inserted into a slot formed at a specific position of an electronic device. The SIM card 214 can include unique identification information (for example, an integrated circuit card identifier (ICCID)) or subscriber information (for example, an international mobile subscriber identity (IMSI)).

The memory 220 can include an internal memory 222 or an external memory 224. The memory 220 can be the memory 130 shown in FIG. 1, for example. The internal memory 222 can include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory) According to an embodiment of the present disclosure, the internal memory 222 can have a form of Solid State Drive (SSD). The external memory 224 can further include compact flash (CF), secure digital (SD), micro secure digital (Micro-SD), mini secure digital (Mini-SD), extreme digital (xD), or memorystick.

The communication module 230 can include a wireless communication module 231 or an RF module 234. The communication module 230 can be the communication unit 160 shown in FIG. 1, for example. The wireless communication module 231 can include a Wi-Fi 233, Bluetooth (BT) 235, a GPS 237, or a near field communication (NFC) 239. For example, the wireless communication module 231 can provide a wireless communication function by using a wireless frequency. Additionally or alternatively, the wireless communication module 231 can include a network interface (for example, a LAN card) or a modem for connecting the hardware 200 to a network (for example, Internet, local area network (LAN), wire area network (WAN), telecommunication network, cellular network, satellite network, or plain old telephone service (POTS)).

The RF module 234 can be responsible for data transmission, for example, the transmission of an RF signal or a called electrical signal. Although not shown in the drawings, the RF module 234 can include a transceiver, a power amp module (PAM), a frequency filter, or a low noise amplifier (LNA). The RF module 234 can further include components for transmitting/receiving electromagnetic waves on free space in a wireless communication, for example, conductors or conducting wires.

The sensor module 240 can include at least one of a gesture sensor 240A, a gyro sensor 240B, a pressure sensor 240C, a magnetic sensor 240D, an acceleration sensor 240E, a grip sensor 240F, a proximity sensor 240G, a red, green, blue (RGB) sensor 240H, a bio sensor 240I, a temperature/humidity sensor 240J, an illumination sensor 240K, and a ultra violet (UV) sensor 240M. The sensor module 240 measures physical quantities or detects an operating state of an electronic device, thereby converting the measured or detected information into electrical signals. Additionally/alternately, the sensor module 240 can include an E-nose sensor (not shown), an electromyography (EMG) sensor, an electroencephalogram (EEG) sensor (not shown), or an electrocardiogram (ECG) sensor (not shown). The sensor module 240 can further include a control circuit for controlling at least one sensor therein.

The user input unit 250 can include a touch panel 252, a (digital) pen sensor 254, a key 256, or an ultrasonic input device 258. The user input unit 250 can be the user input unit 140 shown in FIG. 1, for example. The touch panel 252 can recognize a touch input through at least one of a capacitive, resistive, infrared, or ultrasonic method, for example. Additionally, the touch panel 252 can further include a controller (not shown). In the case of the capacitive method, both direct touch and proximity recognition are possible. The touch panel 252 can further include a tactile layer. In this case, the touch panel 252 can provide a tactile response to a user.

The (digital) pen sensor 254 can be implemented through a method similar or identical to that of receiving a user's touch input or an additional sheet for recognition. As the key 256, a keypad or a touch key can be used, for example. The ultrasonic input device 258, as a device confirming data by detecting sound waves through a mike (for example, the mike 288) in a terminal, can provide wireless recognition through a pen generating ultrasonic signals. According to an embodiment of the present disclosure, the hardware 200 can receive a user input from an external device (for example, a network, a computer, or a server) connected to the hardware 200 through the communication module 230.

The display module 260 can include a panel 262 or a hologram 264. The display module 260 can be the display module 150 shown in FIG. 1, for example. The panel 262 can include a liquid-crystal display (LCD) or an active-matrix organic light-emitting diode (AM-OLED). The panel 262 can be implemented to be flexible, transparent, or wearable, for example. The panel 262 and the touch panel 252 can be configured with one module. The hologram 264 can show three-dimensional images in the air by using the interference of light. According to an embodiment of the present disclosure, the display module 260 can further include a control circuit for controlling the panel 262 or the hologram 264. The display module 260 can provide a message on whether to receive an input from a second input tool, receive a command for receiving an input from the second input tool, and display the message.

The interface 270 can include a high-definition multimedia interface (HDMI) 272, a universal serial bus (USB) 274, a projector 276, or a D-subminiature (sub) 278. Additionally or alternately, the interface 270 can include a secure Digital (SD)/multi-media card (MMC) (not shown) or an infrared data association (IrDA) (not shown).

The audio codec 280 can convert voice and electrical signals in both directions. The audio codec 280 can convert voice information inputted or outputted through a speaker 282, a receiver 284, an earphone 286, or a mike 288.

The camera unit 291, as a device for capturing an image and video, can include at least one image sensor (for example, a front lens or a rear lens), an image signal processor (ISP) (not shown), or a flash LED (not shown).

The power management module 295 can manage the power of the hardware 200. Although not shown in the drawings, the power management module 295 can include a power management integrated circuit (PMIC), a charger integrated circuit (IC), or a battery fuel gauge.

The PMIC can be built in an IC or SoC semiconductor, for example. A charging method can be classified as a wired method and a wireless method. The charger IC can charge a battery and can prevent overvoltage or overcurrent flow from a charger. According to an embodiment of the present disclosure, the charger IC can include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, can be added.

A battery gauge can measure the remaining amount of the battery 296, or a voltage, current, or temperature thereof during charging. The battery 296 can generate electricity and supplies power. For example, the battery 296 can be a rechargeable battery.

The indicator 297 can display a specific state of the hardware 200 or part thereof (for example, the AP 211), for example, a booting state, a message state, or a charging state. The motor 298 can convert electrical signals into mechanical vibration. The A Main Control Unit (MCU) (not shown) can control the sensor module 240.

Although not shown in the drawings, the hardware 200 can include a processing device (for example, a GPU) for mobile TV support. A processing device for mobile TV support can process media data according to the standards such as digital multimedia broadcasting (DMB), digital video broadcasting (DVB), or media flow.

The names of the above-mentioned components in hardware according to an embodiment of the present disclosure can vary according to types of an electronic device. Hardware according to an embodiment of the present disclosure can be configured including at least one of the above-mentioned components or additional other components. Additionally, some of components in hardware according to an embodiment of the present disclosure are configured as one entity, so that functions of previous corresponding components are performed identically.

Figure 3:
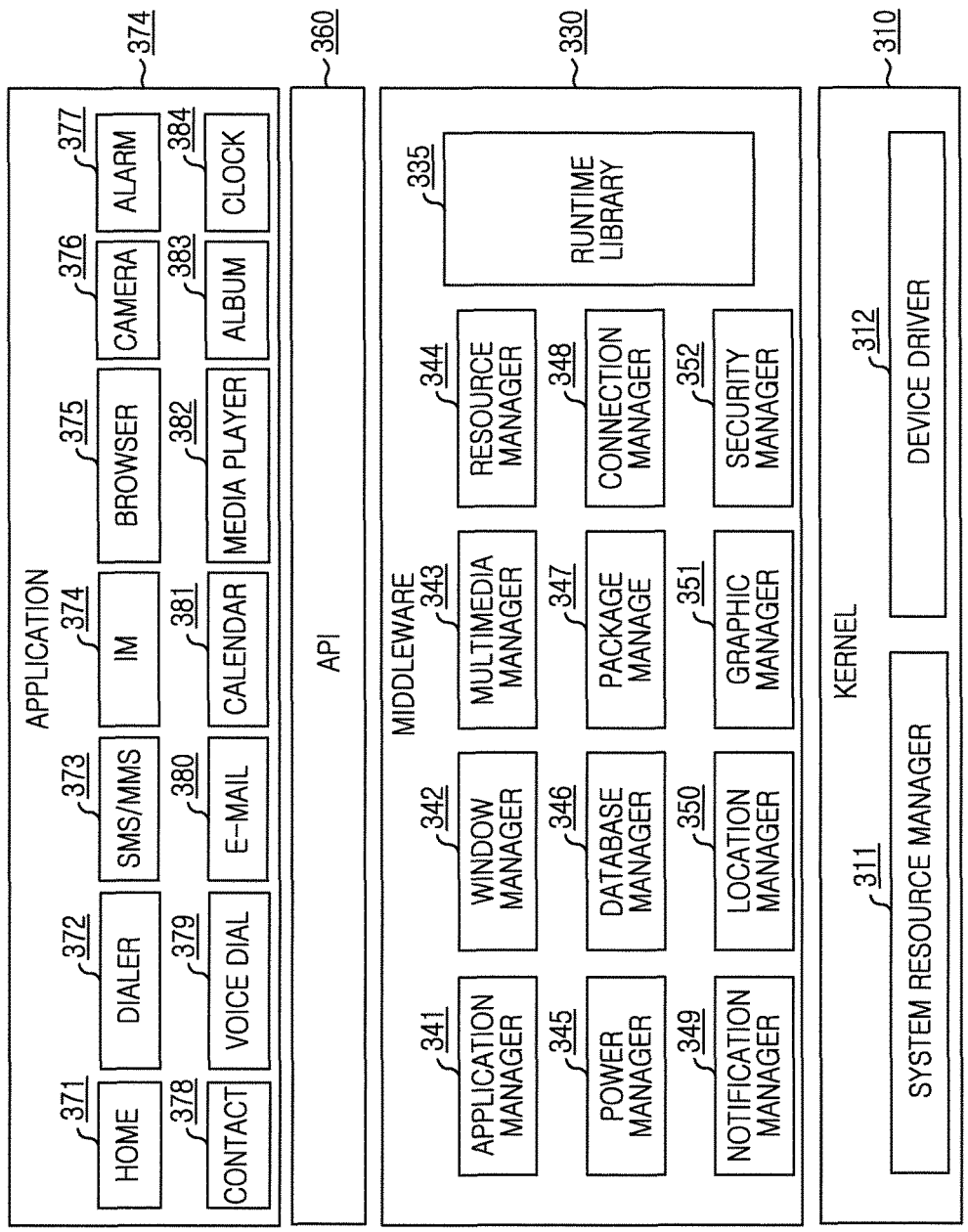
FIG. 3 is a block diagram of a programming module according to an embodiment of the present disclosure.

FIG. 3 is a block diagram of a programming module according to an embodiment of the present disclosure. The programming unit 300 can be included (for example, stored) in the electronic device 100 (for example, the memory 130) of FIG. 1. At least part of the programming module 300 can be configured with software, firmware, hardware, or a combination thereof. The programming module 300 can include an operating system (OS) controlling a resource relating to an electronic device (for example, the electronic device 100) implemented in hardware (for example, the hardware 200) or various applications (for example, the application 370) running on the OS. For example, the OS can include Android™, iOS™, Windows™, Symbian™, Tizen™, or Bada™. Referring to FIG. 3, the programming module 300 can include a kernel 310, a middleware 330, an application programming interface (API) 360, or an application 370.

The kernel 310 (for example, the kernel 131) can include a system resource manager 311 or a device driver 312. The system resource manager 311 can include a process management unit (not shown), a memory management unit (not shown), or a file system management unit (not shown), for example. The system resource manager 311 can perform control, allocation, or recovery of a system resource. The device driver 312 can include a display driver (not shown), a camera driver (not shown), a Bluetooth driver (not shown), a sharing memory driver (not shown), a USB driver (not shown), a keypad driver (not shown), a keypad driver (not shown), a Wi-Fi driver (not shown), or an audio driver (not shown). Additionally, according to an embodiment of the present disclosure, the device driver 312 can include an inter-processing communication (IPC) driver (not shown).

The middleware 330 can include a plurality of pre-implemented modules for providing functions that the application 370 commonly requires. Additionally, the middleware 330 can provide functions through the API 360 to allow the application 370 to efficiently use a limited system resource in an electronic device. For example, as shown in FIG. 3, the middleware 330 (for example, the middleware 132) can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 can include a library module in which a compiler is used to add a new function through programming language while the application 370 is executed. According to an embodiment of the present disclosure, the runtime library 335 can perform functions relating to an input/output, memory management, or calculation operation.

The application manager 341 can manage a life cycle of at least one application among the applications 370. The window manager 342 can manage a GUI resource using a screen. The multimedia manager 343 can recognize a format necessary for playing various media files and can perform encoding or decoding on a media file by using codec appropriate for a corresponding format. The resource manager 344 can manage a resource such as source code, memory, or storage space of at least one application among the applications 370.

The power manager 345 manages a battery or power in operation with basic input/output system (BIOS) and provides power information necessary for an operation. The database manager 346 can perform a management operation to generate, search or change a database used for at least one application among the applications 370. The package manager 347 can manage the installation or update of an application distributed in a package file format.

The connectivity manager 348 can manage a wireless connection such as Wi-Fi or Bluetooth. The notification manager 349 can display or notify events such as arrival messages, appointments, and proximity alerts in a manner that is not disruptive to a user. The location manager 350 can manage location information of an electronic device. The graphic manager 351 can manage an effect to be provided to a user or a user interface relating thereto. The security manager 352 can provide a general security function necessary for system security or user authentication. According to an embodiment of the present disclosure, when an electronic device (for example, the electronic device 100) has a call function, the middleware 330 can further include a telephony manager (not shown) for managing a voice or video call function of the electronic device.

The middleware 330 can generate and use a new middleware module through various function combinations of the above-mentioned internal component modules. The middleware 330 can provide modules specified according to types of an OS so as to provide distinctive functions. Additionally, the middleware 330 can delete some existing components or add new components dynamically. Accordingly, some components listed in an embodiment of the present disclosure can be omitted, other components are added, or components having different names but performing similar functions can be substituted.

The API 360 (for example, the API 133) can be provided as a set of API programming functions with a different configuration according OS. For example, in the case of Android™or iOS™, for example, one API set can be provided by each platform, and in the case of Tizen™, for example, more than two API sets can be provided.

The application 370 (for example, the application 134), for example, can include a preloaded application or a third part application.

At least part of the programming module 300 can be implemented using a command stored in computer-readable storage media. When an instruction is executed by at least one processor (for example, the processor 210), the at least one processor can perform a function corresponding to the instruction. The computer-readable storage media can include the memory 220, for example. At least part of the programming module 300 can be implemented (for example, executed) by the processor 210, for example. At least part of the programming module 300 can include a module, a program, a routine, sets of instructions, or a process to perform at least one function, for example.

The names of components of a programming module (for example, the programming unit 300) according to an embodiment of the present disclosure can vary according to types of OS. Additionally, a programming module can include at least one of the above-mentioned components or additional other components. Or, part of the programming module can be omitted.

Figure 4A:
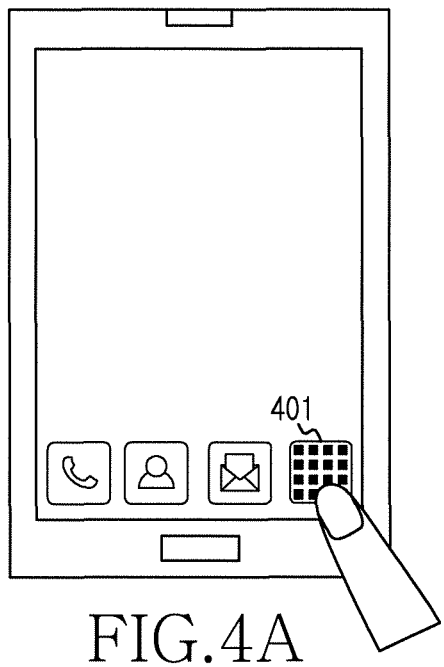
FIGS. 4A, 4B and 4C are a view when a battery saving mode is set in an electronic device according to an embodiment of the present disclosure.
Figure 4B:
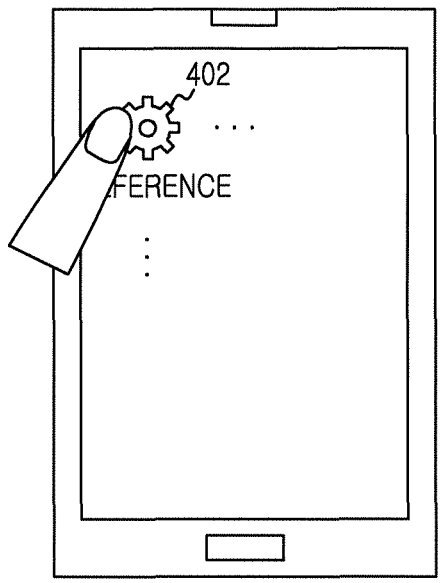
Figure 4C:
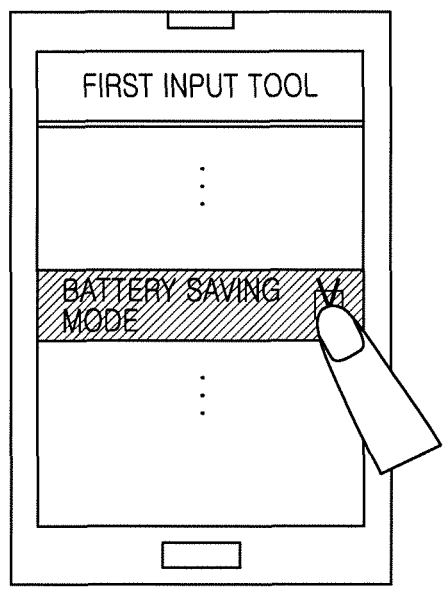

FIGS. 4A, 4B and 4C illustrate how to set a battery saving mode in an electronic device according to an embodiment of the present disclosure. First, the electronic device can receive a selection on the on/off of the battery saving mode. Here, the battery saving mode can inactivate a part of functions or components including the touch screen and does not detect an input from an input tool or a part of a body including a finger. In more detail, while the battery saving mode is turned on in the electronic device, if a predetermined input tool is inserted into a body of the electronic device, the screen of the electronic device will not detect an input from another input tool. However, while the battery saving mode is turned off, even if a predetermined input tool, e.g., a stylus pen is inserted into a tool-holder of the electronic device, the electronic device will detect an input from another input tool.

That is, when the input tool is inserted into a body of the electronic device, the electronic device can determine whether to detect predetermined information from another input tool according to whether the battery saving mode is turn on or off. Hereinafter, an embodiment for setting a battery saving mode in an electronic device according to an embodiment of the present disclosure is described in more detail.

First, the electronic device can select one icon from a plurality of icons displayed on a display module of the electronic device in order to execute the battery saving mode. For example, as shown in FIG. 4A, the user can select an application icon 401 to display a stored application from the plurality of icons displayed on the display module of the electronic device.

Then, the user can select an application for setting preferences among the plurality of applications displayed on the display module. For example, as shown in FIG. 4B, the user can select an icon for setting preferences 402 among icons displayed on the display module.

Then, after checking a battery saving mode, the electronic device can enter the battery saving mode, as shown in FIG. 4C.

Figure 5A:
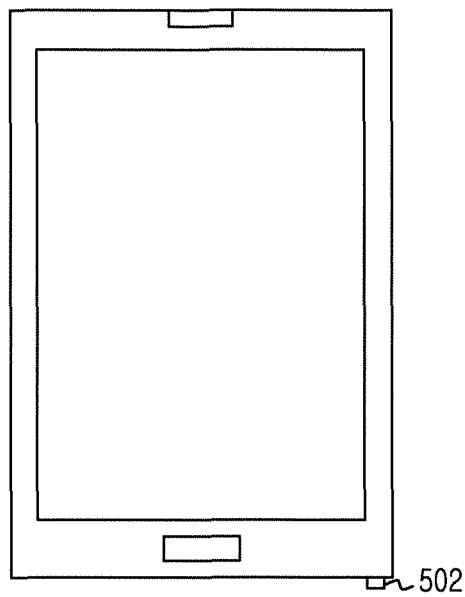
FIGS. 5A, 5B, 5C and 5D are a view when a second input tool is set to be used in an electronic device according to an embodiment of the present disclosure.
Figure 5B:
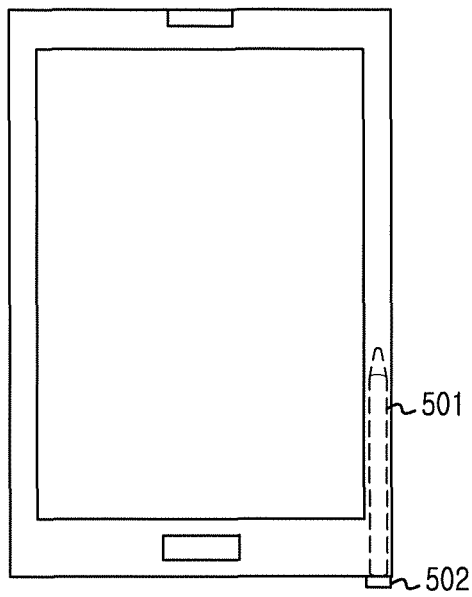
Figure 5C:
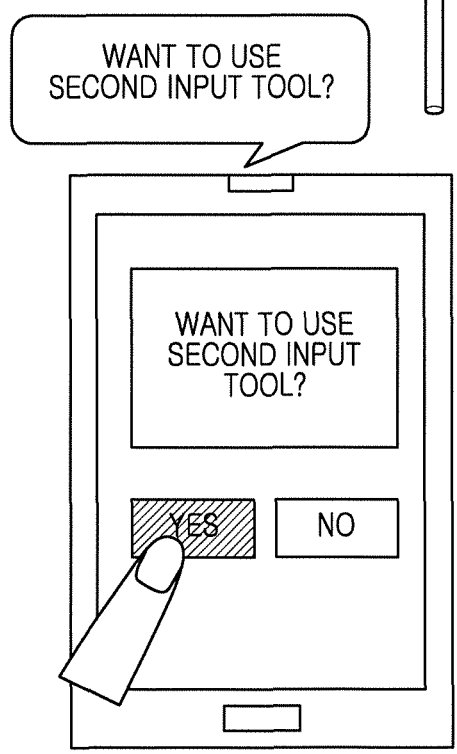

FIGS. 5A, 5B, 5C are 5D illustrate how a second input tool is set to be used in an electronic device according to an embodiment of the present disclosure. First, the electronic device detects that the first input tool is inserted into a tool-holder of the electronic device. For example, as shown in FIGS. 5A and 5B, the electronic device recognizes that the first input tool 501 (e.g., a stylus pen) is separated from or inserted into a tool-holder 502 by a user's selection. When a first input tool is inserted into a tool-holder, an electronic device can be set to receive an input from another second input tool. Herein, the second input tool, as an input tool other than the first input tool, can be any input tool for entering data on a display module of an electronic device, e.g., when the first input tool is inserted into a tool-holder of the electronic device.

In some embodiments, as shown in FIG. 5C, the electronic device can display an inquiry such as "do you want to use the second input tool?" on the display module, and also provides same message as voice through a speaker of the electronic device.

Then, when receiving a command for using the second input tool, the electronic device displays a guide message indicating that second input tool can be used to enter an input from then on.

Figure 5D:
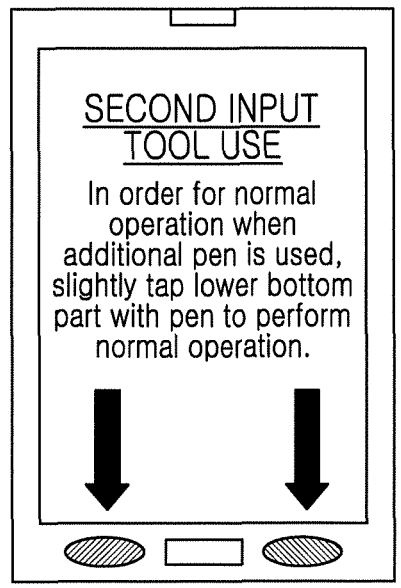

In some embodiments, as shown in FIG. 5D, the electronic device can display a guide message such as "in order for normal operation, slightly tap the lower bottom part with a pen to perform normal operation" on the display module of the electronic device.

Figure 6:
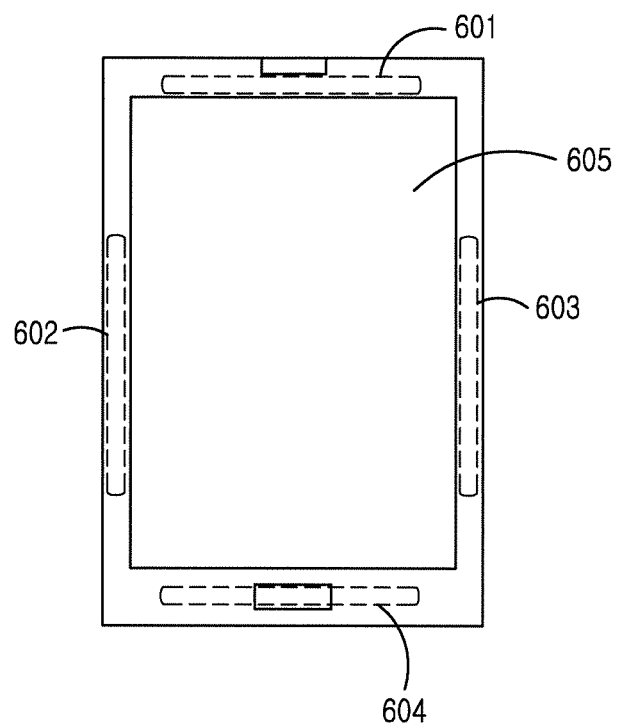
FIG. 6 is a view illustrating a set first area and a set second area in an electronic device according to an embodiment of the present disclosure.

FIG. 6 illustrates an electronic device including a first set of areas and a second set of areas according to an embodiment of the present disclosure. When a first input tool is inserted into a tool-holder, the electronic device can determine whether to enter a battery saving mode. In a battery saving mode, the electronic device switches a first set of areas into an idle mode. Herein, the first area can be an area other than an area for receiving an input from the second input tool. In more detail, the first area can be an area other than a display module area for receiving an input from the second input tool.

For example, the first set of areas can include areas 601, 602, 603, and 604, other than the display area 605 of the electronic device. In more detail, the first set of areas can include an upper area 601, a left area 602, a right area 603, and a lower area 604.

That is, in a battery saving mode, the electronic device can switch the first set of areas into an idle mode and the second area, e.g., the display area into a lock mode. Thus, the electronic device can detect an input on the first area while the device does not detect any input on the display area from an input tool. Also, since the electronic device switches only the first area into the idle mode, battery consumption is reduced. Then, when an input is detected from the first area, the electronic device can switch second group areas to a lock mode into an idle mode.

Herein, the second area can be an area for receiving an input from the second input tool. For example, as shown in FIG. 6, while the first group areas 601, 602, 603, and 604 switch into an idle mode, if it is detected that an arbitrary area among the first areas 601, 602, 603, and 604 is selected from the second input tool, the electronic device can switch the second area set to a lock mode into an idle mode. That is, when it is detected that an arbitrary area is selected from the first areas 601, 602, 603, and 604, the electronic device can switch the display module into an idle mode in order to receive predetermined information from the second input tool.

Figures 7A, 7B:
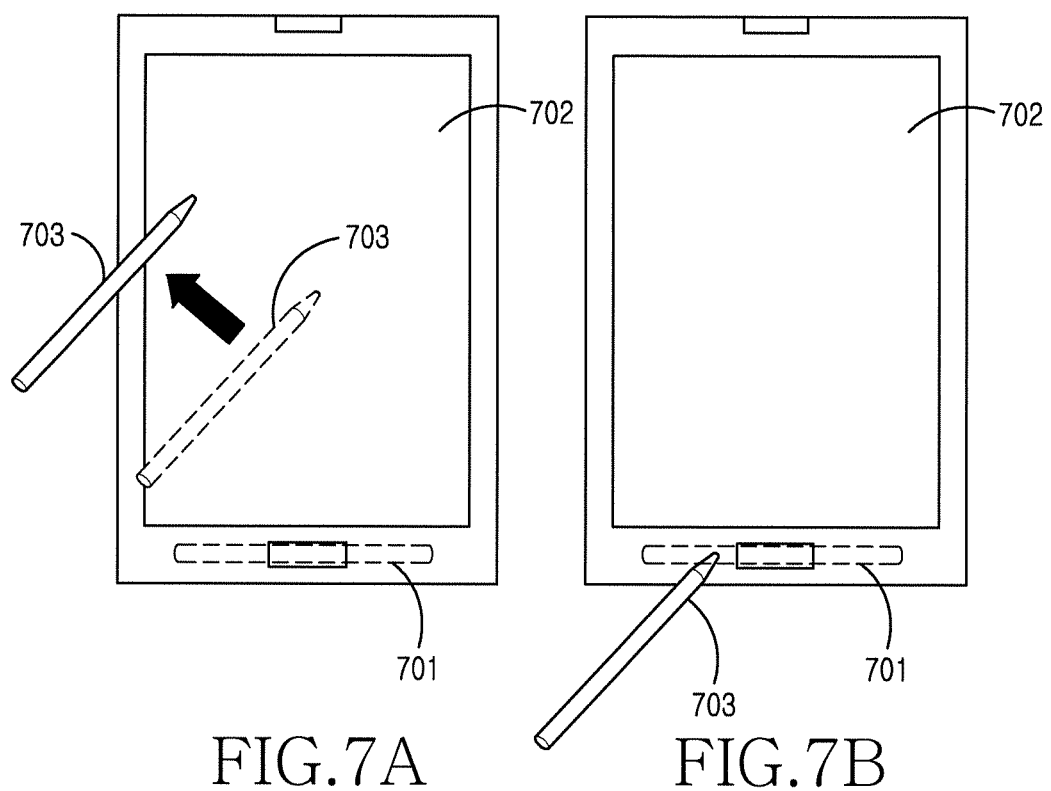
FIGS. 7A and 7B are a view when an electronic device receives an input from a second input tool while only a first area switches into an idle mode according to an embodiment of the present disclosure.

FIGS. 7A and 7B are views when an electronic device receives an input from a second input tool while only a first area switches into an idle mode according to the first embodiment of the present disclosure. The first area in the idle mode is ready to receive an input from a second input tool. In some embodiments, the first area can locate at least one side of a bezel of the electronic device.

In the beginning, a first input tool touches a first set of areas of an electronic device, and the electronic device enters a battery saving mode. In the battery saving mode, only a first area 701 is switched into an idle mode and the second area turns to a lock mode. In the embodiment, the first area 701 locates at a lower part of the electronic device and a second area 702 is a main touch display area.

After switching only the first area 701 into an idle mode, the electronic device can set the second area 702 to a lock mode in order to reduce battery consumption. That is, a touch input can be detected from the second input tool on the first area 701 and a touch input will not be detected from the second input tool in the second area 702.

As long as the first area 702 is not touched by the second input tool 703 during an idle mode, the electronic device will not detect an input of the second input tool 703. Since only the first area 701 switches into an idle mode, the second area 702 in a lock mode cannot receive predetermined information from the second input tool 703.

For example, as shown in FIG. 7A, since the second area 702 of the display module of the electronic device is in a lock mode, the electronic device does not detect predetermined information inputted from the second input tool 703.

If the first area 701 is selected during an idle mode, the second area 702 (touch screen area) is activated and detects a touch input inputted from, for example, the second input tool 703 through the second area 702. The first area can locate at other positions, such as a top, a left side, or a right side in a bezel.

Figure 8:
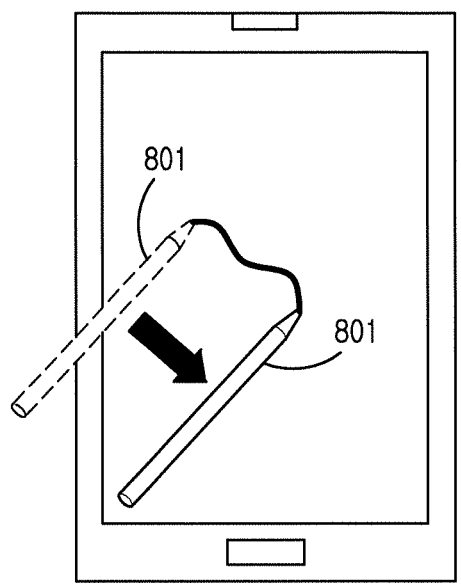
FIG. 8 is a view when an electronic device receives an input from a second input tool while only a first area switches into an idle mode according to a second embodiment of the present disclosure.

FIG. 8 illustrate that an electronic device receives an input from a second input tool while only the first area is in an idle mode according to a second embodiment of the present disclosure. Hereinafter, the second embodiment in which an electronic device receives an input from a second input tool as only a first area switches into an idle mode will be described in more detail. Herein, after a first input tool touches a set area of an electronic device, the electronic device enters a battery saving mode. Additionally, the electronic device receives a command for receiving an input from a second input tool 801 and switches only a first area into an idle mode.

Once the first area is switched to an idle mode, the second area is turned to a lock mode in order to reduce battery consumption. That is, a touch input can be detected from the second input tool 801 in the first area and a touch input may not be detected from the second input tool 801 in the second area.

Then, when the second area is selected while the first area is not selected first from the second input tool 801, the electronic device may not detect an input of the second input tool 801.

However, if the first area in an idle mode is selected first, the electronic device can detect predetermined information inputted from the second input tool 801 through the second area.

For example, as shown in FIG. 8, if the first area in an idle mode is selected from the second input tool, the electronic device can detect predetermined information inputted from the second input tool 801 through the second area.

Figure 9:
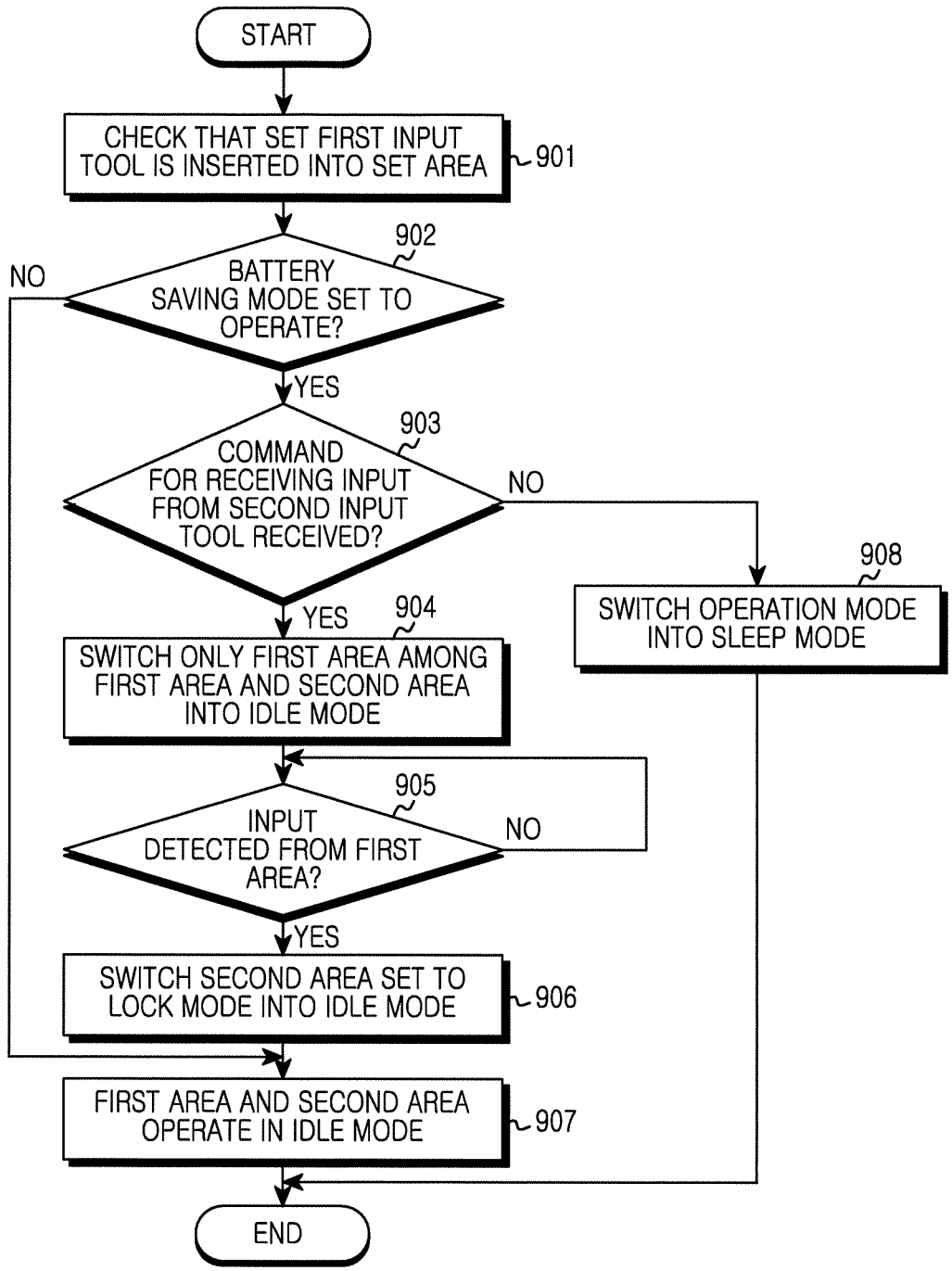
FIG. 9 is a flowchart illustrating an operation order of an electronic device according to an embodiment of the present disclosure.

FIG. 9 is a flowchart illustrating an operation order of an electronic device according to an embodiment of the present disclosure. First, as shown in FIG. 9, the electronic device confirms that a set first input tool is inserted into a set area in operation 901. Herein, the first input tool, as an input tool set to input predetermined information to the display module of the electronic device, can be an input tool inserted into a set area of the electronic device when a user does not use it.

Then, the electronic device determines whether a battery saving mode is set to operate in operation 902. Here, the battery saving mode can be a mode setting whether to receive predetermined information from another input tool in addition to a set input tool. In more detail, while the battery saving mode is set to "on" in the electronic device, if a set input tool is inserted into the electronic device, the electronic device may not receive predetermined information from another input tool. However, while the battery saving mode is set to "off" in the electronic device, even if a set input tool is inserted into the electronic device, the electronic device can receive predetermined information from another input tool. That is, when a set input tool is inserted into a predetermined area of the electronic device, according to whether the battery saving mode is set to "on" or "off", the electronic device can determine whether it is possible to receive predetermined information from another input tool.

If it is determined that the electronic device is set to operate in the battery saving mode in operation 902, the electronic device can determine whether a command for receiving an input from the second input tool is received in operation 903. That is, the electronic device can determine whether a command for receiving predetermined information from another input tool other than the set first input tool is received.

If it is determined that a command for receiving an input from the second input tool is received in operation 903, the electronic device can switch only the first area among the first and second areas into an idle mode in operation 904. Herein, the first area can be an area other than an area for receiving an input from the second input tool. In more detail, the first area can be an area other than a display module area for receiving an input from the second input tool. For example, the first area can be an upper area, a left area, a right area, and a lower area of the electronic device other than the display module of the electronic device. Additionally, the second area can be a display module area for receiving an input from the second input tool.

Then, the electronic device determines whether an input is detected from the first area in operation 905. In more detail, the electronic device can determine whether the set first area is selected from the second input tool. For example, the electronic device can determine whether the first area receives a touch input from the second input tool.

If an input is detected from the first area in operation 905, the electronic device can switch the second area set to a lock mode into an idle mode in operation 906. For example, while only the first area switches into an idle mode, if it is detected that an arbitrary area among the first area is selected from the second input tool, the electronic device can switch the second area set to a lock mode into an idle mode. That is, when it is detected that an arbitrary area is selected from the first area, the electronic device can switch the display module into an idle mode in order to receive predetermined information from the second input tool.

Then, the electronic device confirms that the first area and the second area operate in an idle mode in operation 907. That is, when the set first area is not selected from the second input tool, in order to reduce battery consumption, the electronic device can set the second area to a lock mode and after the first area is selected, the electronic device can switch the second area into an idle mode in order to receive predetermined information from the second input tool.

If it is determined that the electronic device is not set to operate in the battery saving mode in operation 902, the electronic device can confirm that the first area and the second area operate in an idle mode in operation 907.

If it is determined that a command for receiving an input from the second input tool is not received in operation 903, the electronic device can switch an operation mode into a sleep mode and can then terminate an operation in operation 908.

Figure 10:
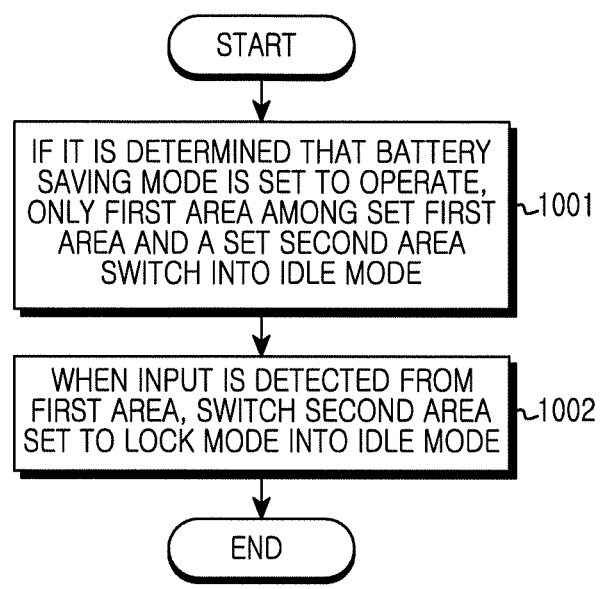
FIG. 10 is a flowchart illustrating a method of an electronic device according to an embodiment of the present disclosure.

FIG. 10 is a flowchart illustrating a method of an electronic device according to an embodiment of the present disclosure. First, as shown in FIG. 10, when it is determined that a battery saving mode is set to operate, the electronic device can switch only the first area among set first and second areas into an idle mode in operation 1001. Herein, the first area can be an area other than an area for receiving an input from the second input tool. In more detail, the first area can be an area other than a display module area for receiving an input from the second input tool. For example, the first area can be an upper area, a left area, a right area, and a lower area of the electronic device other than the display module of the electronic device. Additionally, the second area can be a display module area for receiving an input from the second input tool.

Then, when an input is detected from the first area, the electronic device can switch the second area set to a lock mode into an idle mode in operation 1002. For example, while only the first area switches into an idle mode, if it is detected that an arbitrary area among the first area is selected from the second input tool, the electronic device can switch the second area set to a lock mode into an idle mode. That is, when it is detected that an arbitrary area is selected from the first area, the electronic device can switch the display module into an idle mode in order to receive predetermined information from the second input tool.

In accordance with another aspect of the present disclosure, an operating method of an electronic device, the method comprising: switching only a first area among a set first area and a set second area into an idle mode; and switching the second area set to a lock mode into the idle mode when an input is detected from the first area.

It will be appreciated that embodiments of the present invention according to the claims and description in the specification can be realized in the form of hardware, software or a combination of hardware and software.

Any such software can be stored in a computer readable storage medium. The computer readable storage medium stores one or more programs (software modules), the one or more programs comprising instructions, which when executed by one or more processors in an electronic device, cause the electronic device to perform a method of the present invention.

Any such software can be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs can be conveyed electronically via any medium such as a communication signal carried over a wired or wireless connection and embodiments suitably encompass the same.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method in an electronic device, the method comprising:
    entering a power saving mode in response to determining that a first stylus pen is inserted into a tool-holder in the electronic device;
    in response to entering the power saving mode, switching a first sensing area of the electronic device into an idle mode and a second sensing area of the electronic device into a lock mode;
    detecting an input inputted by a second stylus pen on the first sensing area in a state in which the first stylus pen is inserted into the tool-holder and the first sensing area is in the idle mode, the second stylus pen being an input tool different from the first stylus pen; and
    in response to detecting the input on the first sensing area in the idle mode, unlocking the second sensing area, wherein the second sensing area is a display area of touch screen, and wherein the first sensing area is a portion of a bezel of the electronic device other than the display area of touch screen.

2. The method of claim 1, wherein the bezel of the electronic device comprises a pair of a left bezel portion and a right bezel portion.

3. The method of claim 1, wherein the bezel of the electronic device comprises a pair of an upper bezel portion and a lower bezel portion.

4. The method of claim 1, wherein the second sensing area in the lock mode does not detect any input on the second sensing area.

5. The method of claim 1, further comprising:
    if the input on the first sensing area in the idle mode has not been detected for a certain time, switching the electronic device into a sleep mode.

6. An electronic device comprising:
    a processor configured to:
        enter a power saving mode in response to determining that a first stylus pen is inserted into a tool-holder in the electronic device;
        in response to entering the power saving mode, switch a first sensing area of the electronic device into an idle mode and a second sensing area of the electronic device into a lock mode;
        detect an input inputted by a second stylus pen on the first sensing area in a state where the first stylus pen is inserted into the tool-holder and the first sensing area is in the idle mode, the second stylus pen being an input tool different from the first stylus pen; and
        in response to detecting the input on the first sensing area in the idle mode, unlock the second sensing area, wherein the second sensing area is a display area of touch screen, and wherein the first sensing area is a portion of a bezel of the electronic device other than the display area of touch screen.

7. The electronic device of claim 6, wherein the bezel of the electronic device comprises a pair of a left bezel portion and a right bezel portion.

8. The electronic device of claim 6, wherein the bezel of the electronic device comprises a pair of an upper bezel portion and a lower bezel portion.

9. The electronic device of claim 6, wherein the second sensing area in the lock mode does not detect any input on the second sensing area.

10. The electronic device of claim 6, wherein if the input on the first sensing area in the idle mode has not been detected for a certain time, the processor is configured to switch the electronic device into a sleep mode.

* * * * *